(12) United States Patent
Han et al.

(10) Patent No.: US 12,731,861 B2
(45) Date of Patent: Sep. 8, 2026

(54) SEPARATOR FOR ELECTROCHEMICAL DEVICE AND METHOD FOR MANUFACTURING THE SAME

(71) Applicant: LG ENERGY SOLUTION, LTD., Seoul (KR)

(72) Inventors: Da-Kyung Han, Daejeon (KR); So-Mi Jeong, Daejeon (KR); Min-Ji Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 739 days.

(21) Appl. No.: 18/023,922

(22) PCT Filed: Sep. 15, 2021

(86) PCT No.: PCT/KR2021/012641

§ 371 (c)(1),
(2) Date: Feb. 28, 2023

(87) PCT Pub. No.: WO2022/060110

PCT Pub. Date: Mar. 24, 2022

(65) Prior Publication Data

US 2023/0327286 A1 Oct. 12, 2023

(30) Foreign Application Priority Data

Sep. 18, 2020 (KR) ........................ 10-2020-0120881

(51) Int. Cl.
*H01M 50/446* (2021.01)
*H01M 50/403* (2021.01)
(Continued)

(52) U.S. Cl.
CPC ....... *H01M 50/446* (2021.01); *H01M 50/403* (2021.01); *H01M 50/449* (2021.01); *H01M 50/491* (2021.01)

(58) Field of Classification Search
None
See application file for complete search history.

(56) References Cited

U.S. PATENT DOCUMENTS

2003/0169574 A1* 9/2003 Maruyama ......... G06K 19/0716 361/760
2011/0003209 A1 1/2011 Katayama et al.
(Continued)

FOREIGN PATENT DOCUMENTS

CN 109841779 A 6/2019
EP 2 800 166 B1 3/2018
(Continued)

OTHER PUBLICATIONS

Machine translation of WO2016/175605, published on Nov. 3, 2016 (Year: 2016).*
(Continued)

*Primary Examiner* — Anca Eoff
(74) *Attorney, Agent, or Firm* — Birch, Stewart, Kolasch & Birch, LLP

(57) ABSTRACT

A separator for an electrochemical device, where the separator includes a semi-crystalline and/or amorphous polymer, such as polyvinyl acetate and polyethylene-co-vinyl acetate, as a binder polymer of an inorganic coating layer. The surfaces of the inorganic particles are at least partially coated with a coupling agent. Therefore, it is possible to prevent the inorganic particles from being detached from the inorganic coating layer. In addition, phase separation is accelerated under a humidified condition in manufacturing the separator so that the surface of the separator may be provided with an adhesive portion in which a large amount of binder polymer is distributed. As a result, the separator may have improved binding force to an electrode.

12 Claims, 2 Drawing Sheets

(51) Int. Cl.
*H01M 50/449* (2021.01)
*H01M 50/491* (2021.01)

(56) References Cited

U.S. PATENT DOCUMENTS

| | | | | |
|---|---|---|---|---|
| 2013/0209861 | A1 | 8/2013 | Yong et al. | |
| 2015/0086714 | A1 | 3/2015 | Yu et al. | |
| 2015/0280197 | A1 | 10/2015 | Zhao et al. | |
| 2017/0025716 | A1* | 1/2017 | Suzuki | H01M 50/451 |
| 2018/0034025 | A1 | 2/2018 | Lee et al. | |
| 2018/0123106 | A1 | 5/2018 | Shin et al. | |
| 2018/0212219 | A1 | 7/2018 | Kim et al. | |
| 2021/0066692 | A1 | 3/2021 | Jeong et al. | |
| 2021/0280944 | A1 | 9/2021 | Jang et al. | |
| 2021/0280945 | A1 | 9/2021 | Kim et al. | |
| 2022/0069419 | A1* | 3/2022 | Han | H01M 50/449 |
| 2022/0294078 | A1* | 9/2022 | Kim | H01M 50/446 |
| 2023/0282939 | A1* | 9/2023 | Kim | H01M 10/0525 429/129 |

FOREIGN PATENT DOCUMENTS

| | | | | |
|---|---|---|---|---|
| EP | 3 675 229 | A1 | 7/2020 | |
| JP | WO2008/029922 | A1 | 1/2010 | |
| JP | 2011-54503 | A | 3/2011 | |
| JP | 2011-108444 | A | 6/2011 | |
| JP | 2014-510388 | A | 4/2014 | |
| JP | 2014-160665 | A | 9/2014 | |
| JP | 2015-191886 | A | 11/2015 | |
| JP | 2017-123330 | A | 7/2017 | |
| JP | WO2018/055882 | A1 | 3/2018 | |
| JP | 2018-530860 | A | 10/2018 | |
| JP | 2020-123453 | A | 8/2020 | |
| KR | 10-2012-0124239 | A | 11/2012 | |
| KR | 10-2015-0040129 | A | 4/2015 | |
| KR | 10-2016-0129762 | A | 11/2016 | |
| KR | 10-2017-0025434 | A | 3/2017 | |
| KR | 10-2018-0055277 | A | 5/2018 | |
| KR | 10-2020-0034470 | A | 3/2020 | |
| KR | 10-2020-036648 | A | 4/2020 | |
| KR | 10-2020-0049649 | A | 5/2020 | |
| KR | 10-2020-0061575 | A | 6/2020 | |
| KR | 10-2020-0078416 | A | 7/2020 | |
| WO | WO 2014/136813 | A1 | 9/2014 | |
| WO | WO-2016175605 | A1 * | 11/2016 | H01M 50/489 |
| WO | WO-2019240501 | A1 * | 12/2019 | H01M 50/431 |
| WO | WO-2020256313 | A1 * | 12/2020 | H01M 50/451 |
| WO | WO-2021034060 | A1 * | 2/2021 | H01M 50/451 |

OTHER PUBLICATIONS

International Search Report for PCT/KR2021/012641 (PCT/ISA/210) mailed on Jan. 7, 2022.

Extended European Search Report for European Application No. 21869732.4, dated Mar. 31, 2025.

* cited by examiner

SEPARATOR FOR ELECTROCHEMICAL DEVICE AND METHOD FOR MANUFACTURING THE SAME

TECHNICAL FIELD

The present application claims priority to Korean Patent Application No. 10-2020-0120881 filed on Sep. 18, 2020 in the Republic of Korea. The present disclosure relates to a separator for an electrochemical device and a method for manufacturing the same. Particularly, the present disclosure relates to a separator for an electrochemical device including inorganic particles and having improved binding force to an electrode, and a method for manufacturing the same.

BACKGROUND ART

Recently, lithium-ion secondary batteries have been used widely as power sources of portable electronic instruments, such as notebook PCs, cellular phones, digital cameras, camcorders, or the like. In addition, since such lithium-ion secondary batteries have high energy density, they have been applied to transport means, such as electric vehicles.

As portable electronic instruments have been downsized and weight-lightened, casings of nonaqueous secondary batteries have been simplified. Originally, battery cans made of stainless steel were used as casings. However, after casings made of aluminum cans have been developed, soft pack casings made of aluminum laminate packs have been developed recently. In the case of a soft pack casing made of aluminum laminate, it is flexible, and thus may form a gap between an electrode and a separator during charge/discharge, resulting in the technical problem of degradation of cycle life. To solve the problem, technologies of adhesion between an electrode and a separator are important, and many technical attempts have been made.

In general, a separator for an electrochemical device has a structure including a porous polymer film (separator substrate) and an inorganic coating layer formed on at least one surface of the separator substrate. The inorganic coating layer includes inorganic particles and a binder resin, and is introduced to provide the separator substrate with durability (for preventing film from breakage) or heat resistance/stability (for preventing heat shrinking). As a binder resin for such a separator, a polyvinylidene fluoride (PVdF)-based resin has been used frequently, and the binder resin is migrated toward the separator surface through a humidified phase separation process to form an adhesive top layer portion having a high content of binder resin in the vicinity of the surface of the inorganic coating layer. However, since the adhesion of a PVdF-based resin itself is low, it is difficult to ensure a high level of binding force. To improve the adhesion, the content or coating amount of the binder resin may be increased. However, in this case, the adhesive layer becomes thick to cause a decrease in energy density and an increase in resistance undesirably. It is required for the adhesive layer of a separator to accomplish both high adhesion and high ion conductivity even with a small thickness. In addition, the separator should be a chemically and electrochemically stable material so that a battery may be used stably for a long time, and the process for manufacturing a separator should have high productivity to allow mass production at low costs. Under these circumstances, there is a need for developing a separator for a secondary battery satisfying the above-mentioned requirements.

DISCLOSURE

Technical Problem

The present disclosure is designed to solve the problems of the related art, and therefore the present disclosure is directed to providing a separator including an inorganic coating layer having improved binding force to an electrode. The present disclosure is also directed to providing a method for manufacturing the separator. It will be easily understood that the objects and advantages of the present disclosure may be realized by the means shown in the appended claims and combinations thereof.

Technical Solution

According to the first embodiment of the present disclosure, there is provided a separator for an electrochemical device, including a porous polymer substrate and an inorganic coating layer on at least one surface of the porous polymer substrate, wherein the inorganic coating layer includes inorganic particles and a binder polymer, the inorganic particles include composite particles having a surface at least partially coated with a coupling compound, the coupling compound includes a functional group capable of being bound to each of the inorganic particles and the binder polymer, and the functional group includes at least one selected from the group consisting of an alkyl group, an alkoxy group and an ester group, and the binder polymer includes an amorphous polymer and/or a semi-crystalline polymer having a glass transition temperature (Tg) of 60° C. or lower.

According to the second embodiment of the present disclosure, there is provided the separator for an electrochemical device as defined in the first embodiment, wherein the binder polymer includes at least one compound represented by the following Chemical Formula 1:

[Chemical Formula 1]

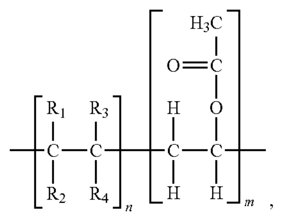

wherein each of $R_1$ to $R_4$ independently represent —H, —$OR_5$, —C(═O)—$R_6$, —C(═O)O—$R_7$, —OC(═O)—$R_8$ or —C(═O)NH—$R_9$; each $R_5$ to $R_9$ independently represents H, or a substituted or non-substituted C1-C5 alkyl group; m is an integer of 1 or more; and n is 0 or an integer of 1 or more.

According to the third embodiment of the present disclosure, there is provided the separator for an electrochemical device as defined in the second embodiment, wherein the binder polymer includes at least one selected from polyvinyl acetate (PVAc) and polyethylene-co-vinyl acetate.

According to the fourth embodiment of the present disclosure, there is provided the separator for an electrochemical device as defined in any one of the first to the third embodiments, wherein the binder polymer has a weight average molecular weight (Mw) of 600,000 or less.

According to the fifth embodiment of the present disclosure, there is provided the separator for an electrochemical device as defined in any one of the first to the fourth embodiments, wherein the coupling compound includes a silane based compound and/or a titanate based compound.

According to the sixth embodiment of the present disclosure, there is provided the separator for an electrochemical device as defined in any one of the first to the fifth embodiments, wherein the inorganic coating layer includes the inorganic particles in an amount of 50 wt % or more, based on 100 wt % of the total weight of the binder polymer and the inorganic particles, and the inorganic coating layer has a porous structure formed from interstitial volumes between the inorganic particles.

According to the seventh embodiment of the present disclosure, there is provided the separator for an electrochemical device as defined in any one of the first to the sixth embodiments, wherein the inorganic coating layer has a top layer portion and a bottom layer portion, wherein the top layer portion includes an electrode adhesive portion in which the binder polymer is distributed at a higher concentration as compared to the bottom layer portion.

According to the eighth embodiment of the present disclosure, there is provided the separator for an electrochemical device as defined in any one of the first to the seventh embodiments, wherein the binder polymer further includes a crystalline binder resin.

According to the ninth embodiment of the present disclosure, there is provided a method for manufacturing the separator as defined in any one of the first to the eighth embodiments, including the steps of: introducing a solvent and a binder polymer to prepare a polymer solution; introducing inorganic particles to the polymer solution to prepare a slurry for forming an inorganic coating layer; and applying the slurry to the surface of a porous polymer substrate and drying under a humidified condition to perform a humidified phase separation process of the inorganic coating layer, wherein the inorganic coating layer has a top layer portion and a bottom layer portion, formed through the humidified phase separation process, wherein the top layer portion comprises an electrode adhesive portion in which the binder polymer is distributed at a higher concentration as compared to the bottom layer portion.

According to the tenth embodiment of the present disclosure, there is provided the method as defined in the ninth embodiment, wherein the inorganic particles include composite particles having the surface entirely coated with a coupling compound.

Advantageous Effects

The separator according to the present disclosure includes a semi-crystalline and/or amorphous polymer, such as PVAc and EVA, as a binder polymer of an inorganic coating layer, wherein the surfaces of the inorganic particles are coated with a coupling agent. Therefore, it is possible to prevent the inorganic particles from being detached from the inorganic coating layer. In addition, phase separation is accelerated under a humidified condition in manufacturing the separator so that the surface of the separator may be provided with an adhesive portion in which a large amount of binder polymer is distributed. As a result, the separator may have improved binding force to an electrode.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
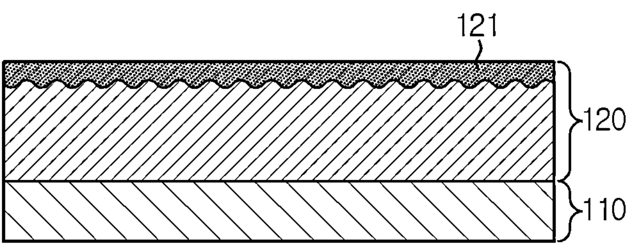
FIG. 1 is a schematic sectional view illustrating the separator according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

Unless otherwise stated, content ratios stated herein refer to weight ratios.

The present disclosure relates to a separator for an electrochemical device and an electrochemical device including the same. As used herein, the term 'electrochemical device' means a device converting chemical energy into electrical energy by electrochemical reactions and has a concept covering a primary battery and a secondary battery, wherein the secondary battery is rechargeable and has a concept covering a lithium-ion battery, a nickel-cadmium battery, a nickel-hydrogen battery, or the like.

1. Separator

1) Structure of Separator

The separator 100 according to the present disclosure includes a porous polymer substrate 110 and an inorganic coating layer 120 formed on at least one surface of the porous polymer substrate. The inorganic coating layer includes inorganic particles and a binder polymer.

According to the present disclosure, the binder polymer includes an amorphous and/or a semi-crystalline polymer. In addition, according to the present disclosure, the inorganic particles are coated with a coupling compound at least partially or totally on the surfaces thereof. In addition, the inorganic coating layer may have a porous structure derived from the spaces (interstitial volumes) among the inorganic particles. Further, according to an embodiment of the present disclosure, the inorganic coating layer may be provided with an adhesive portion having a high content of binder polymer on the top layer portion thereof to a predetermined thickness, thereby providing high binding force to an electrode.

According to an embodiment of the present disclosure, the separator may have a thickness of 5-30 μm and the thickness may be controlled suitably within the above-defined range. For example, the thickness may be 10-25 μm. In addition, the separator may have a permeability of about 50-3000 sec/100 cc.

As used herein, the term 'permeability' means a time required for 100 cc of air to pass through an object, such as a separator or porous polymer substrate, to be tested for permeability, is expressed in the unit of second/100 cc, may be used interchangeably with 'transmission', and is generally represented by Gurley value, or the like. According to an embodiment of the present disclosure, the permeability may be determined according to JIS P8117.

Meanwhile, according to the present disclosure, the porosity and pore size may be determined by BELSORP (BET apparatus) available from BEL JAPAN Co. using an adsorption gas, such as nitrogen, or through a method, such as mercury intrusion porosimetry or capillary flow porosimetry. According to an embodiment of the present disclosure, the thickness and weight of the resultant coating layer may be measured to calculate porosity from the theoretical density of the coating layer.

2) Porous Polymer Substrate

The porous polymer substrate means a porous ion-conducting barrier which allows ions to pass therethrough while interrupting an electrical contact between a negative electrode and a positive electrode, and has a plurality of pores formed therein. The pores are interconnected so that gases or liquids may pass from one surface of the substrate to the other surface of the substrate.

Materials forming the porous polymer substrate may be any organic materials or inorganic materials having electrical insulation property. Particularly, with a view to imparting a shut-down function to a substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may further include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. The porous polymer substrate may include a non-woven web, a porous polymer film, or a laminate of two or more layers thereof, but is not limited thereto.

Particularly, the porous polymer substrate is any one of the following a) to e):

a) A porous film formed by melting/extruding a polymer resin;

b) A multilayer film formed by stacking two or more layers of the porous films of a);

c) A non-woven web formed by integrating filaments obtained by melting/spinning a polymer resin;

d) A multilayer film formed by stacking two or more layers of the non-woven webs of c); and e) A porous composite film having a multilayer structure including two or more of a) to d).

According to the present disclosure, the porous polymer substrate preferably has a thickness of 3-12 μm, or 5-12 μm. When the thickness is smaller than the above-defined range, it is not possible to obtain a sufficient conducting barrier function. On the other hand, when the thickness is excessively larger than the above-defined range (i.e. the porous polymer substrate is excessively thick), the separator may show excessively increased resistance.

According to an embodiment of the present disclosure, the polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult.

As used herein, the term 'molecular weight' refers to weight average molecular weight ($M_w$) and may be expressed in the unit of g/mol. For example, the molecular weight may be determined by using gel permeation chromatography (GPC) (PL GPC220, Agilent Technologies).

In addition, the porous polymer substrate may have a puncture strength of 300 gf or more in terms of improvement of production yield. The puncture strength of a porous substrate refers to the highest puncture load (go measured by carrying out a puncture test with Kato tech KES-G5 handy compression tester under the conditions of a needle tip radius of curvature of 0.5 mm and a puncture rate of 2 mm/sec.

According to an embodiment of the present disclosure, the porous polymer substrate may be any porous polymer substrate, as long as it is a planar porous polymer substrate used for an electrochemical device. For example, an insulating thin film showing high ion permeability and mechanical strength and generally having a pore diameter of 10-100 nm and a thickness of 5-12 μm may be used.

3) Inorganic Coating Layer

According to the present disclosure, the separator includes an inorganic coating layer formed on at least one surface of the porous polymer substrate. The inorganic coating layer includes a mixture containing a binder polymer and inorganic particles. In the inorganic coating layer, the inorganic particles are attached to one another by the binder (i.e. the binder polymer connects the inorganic particles among themselves and fixes them) so that the inorganic particles in the layer may retain their binding states. According to an embodiment of the present disclosure, the inorganic particles are closely packed in the inorganic coating layer, and the inorganic coating layer may have a plurality of micropores derived from the interstitial volumes formed among the inorganic particles. The micropores are interconnected to provide a porous structure which allows gases or liquids to pass from one surface to the other surface. According to an embodiment of the present disclosure, the inorganic particles are totally or partially surface-coated with the binder polymer and are bound to one another in a face-to-face and/or dot-to-dot manner by means of the binder polymer. According to an embodiment of the present disclosure, the inorganic particles may be present in an amount of 50 wt % or more, preferably 60 wt % or more, 70 wt % or more, or 80 wt % or more, based on 100 wt % of the combined weight of the binder polymer and the inorganic particles. Within the above-defined range, the inorganic particles may also be present in an amount of 95 wt % or less, or 90 wt % or less.

The inorganic coating layer preferably has a thickness of 1-5 μm on one surface of the porous substrate. Preferably, the thickness may be 3 μm or more. Within the above-defined range, it is possible to provide excellent adhesion to an electrode, thereby providing increased cell strength of the battery. Meanwhile, an inorganic coating layer thickness of 4 μm or less is advisable in terms of cycle characteristics and resistance characteristics of the battery.

Meanwhile, according to the present disclosure, the inorganic coating layer is provided with an electrode adhesive portion 121 having a high content of binder polymer at the surface portion thereof by virtue of the characteristics of the method for manufacturing a separator described hereinafter. FIG. 1 is a schematic view illustrating the sectional structure of the separator 100 according to an embodiment of the present disclosure. Referring to FIG. 1, the separator according to the present disclosure includes an inorganic coating layer 120 formed on the surface of a porous polymer substrate 110, wherein the binder polymer is distributed at a higher concentration at the top layer portion of the inorganic coating layer as compared to the other portions. For the convenience of description, the top layer portion in which the binder polymer is distributed at a higher concentration will be referred to as 'electrode adhesive portion 121' hereinafter. According to an embodiment of the present disclosure, the electrode adhesive portion results from the migration of the binder polymer toward the top layer portion through a process, such as humidified phase separation. Therefore, the electrode adhesive portion is not a structure separated physically from the inorganic coating layer but is bound integrally and inseparably to the surface of the inorganic coating layer as a part of the inorganic coating layer. In addition, the thickness of the electrode adhesive portion may not be uniform.

B. Materials for Inorganic Coating Layer

B1. Binder Polymer

According to an embodiment of the present disclosure, the binder polymer includes a semi-crystalline polymer, an amorphous polymer or a mixture thereof. According to an embodiment of the present disclosure, the semi-crystalline polymer may have a crystallinity of 60% or less, considering the aspect of improvement of adhesion between an electrode and the separator. Particularly, the binder polymer may include at least one of the compounds represented by the following Chemical Formula 1:

[Chemical Formula 1]

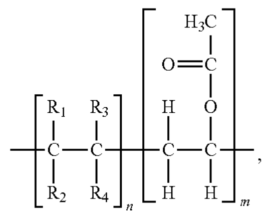

wherein each of $R_1$ to $R_4$ independently represent —H, —$OR_5$, —C(═O)—$R_6$, —C(═O)O—$R_7$, —OC(═O)—$R_8$ or —C(═O)NH—$R_9$; each $R_5$ to $R_9$ independently represents H, or a substituted or non-substituted C1-C5 alkyl group; m is an integer of 1 or more; and n is 0 or an integer of 1 or more. According to an embodiment of the present disclosure, the compound represented by Chemical Formula 1 may include at least one selected from polyvinyl acetate (PVAc) and polyethylene-co-vinyl acetate.

According to an embodiment of the present disclosure, the crystallinity is calculated by dividing an actually measured fusion enthalpy value (ΔH) by the fusion enthalpy value (ΔH) of theoretically perfect crystals (crystallinity 100%) and is expressed in the unit of %. Herein, reference will be made to Polymer Handbook about the fusion enthalpy value (ΔH) of theoretically perfect crystals in the case of known polymers. Otherwise, the crystallinity of any unknown material or newly synthesized material may be calculated by the extrapolation method of extending two points or more crystallinity values.

According to an embodiment of the present disclosure, the binder polymer preferably has a glass transition temperature (Tg) of 60° C. or lower, preferably 30-50° C. When the binder polymer satisfies the above-defined range, it is possible to improve the adhesion between the separator and an electrode. For example, it is possible to ensure an electrode-separator binding force of 300 gf/25 mm (60° C., 6.5 MPa) or more. According to the present disclosure, the binding force is based on the result obtained by dissolving a binder polymer in acetone at a concentration of 5 wt %, coating the solution on a polymer film under a relative humidity of 45%, adhering the resultant product with an electrode at 60° C. under 6.5 MPa, and determining the peel force.

Meanwhile, according to an embodiment of the present disclosure, the binder polymer preferably has a weight average molecular weight (Mw) of 600,000 or less. When the molecular weight (Mw) is larger than the above-defined range, it is difficult to ensure sufficient adhesion to an electrode.

According to the present disclosure, the term 'molecular weight' refers to weight average molecular weight (Mw), and may be expressed in the unit of g/mol. In addition, the molecular weight (Mw) may be determined by using gel permeation chromatography (GPC, PL GPC220, Agilent Technologies).

Meanwhile, according to an embodiment of the present disclosure, the binder polymer may further include a fluorinated binder polymer, such as polyvinylidene fluoride, polyvinylidene fluoride-co-hexafluoropropylene, polyvinylidene fluoride-co-trifluoroethylene (TrFE), polyvinylidene fluoride-co-chlorocluoroethylene (CTFE), polyvinylidene fluoride-co-1,2-difluoroethylene, or polyvinylidene fluoride-co-tetrafluoroethylene (TFE). In addition, besides such fluorinated binder polymers, the binder polymer may further include polymethyl methacrylate, polybutyl acrylate, polybutyl methacrylate, polyacrylonitrile, polyvinyl pyrrolidone, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, or the like. One or more such additional binder polymers may be introduced. In addition, the content of such additional binder polymers may be controlled suitably, considering the adhesion. For example, the content of the additional binder polymers may be 30 wt % or less, based on 100 wt % of the binder polymer.

In addition, according to an embodiment of the present disclosure, the inorganic coating layer may further include an additive, such as a dispersant and/or a thickener, in an amount of 1-3 wt % based on 100 wt % of the inorganic coating layer. According to an embodiment of the present disclosure, the additive may be at least one selected suitably from polyvinyl pyrrolidone (PVP), polyvinyl alcohol (PVA), hydroxyethyl cellulose (HEC), hydroxypropyl cellulose (HPC), ethylhydroxyethyl cellulose (EHEC), methyl cellulose (MC), carboxymethyl cellulose (CMC), hydroxyalkylmethyl cellulose and cyanoethyl polyvinyl alcohol.

B2. Inorganic Particles

According to a particular embodiment of the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5 V based on $Li/Li^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be high-dielectric constant inorganic particles having a dielectric constant of 5 or more, preferably 10 or more. Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$(PLZT, wherein 0<x <1, 0<y<1), $Pb(Mg_{1/3}Nb_{2/3})O_3PbTiO_3$(PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or a mixture thereof.

In addition, as inorganic particles, it is possible to use inorganic particles having lithium-ion transportability, i.e. inorganic particles which contain lithium elements and do not store lithium but transport lithium ions. Non-limiting examples of the inorganic particles having lithium-ion transportability include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (121 x<4, 0<y<13), such as $14Li_2O—9Al_2O_3—38TiO_2—39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), such as $Li_{3.25}Ge_{0.25}P_{0.75}S_4$, lithium nitride ($Li_xN_y$, 0<x<4, 0<y<2), such as $Li_3N$, $SiS_2$-based glass ($Li_xSi_yS_z$, 0<x<3, 0<y<2, 0<z<4), such as $Li_3PO_4—Li_2S—SiS_2$, and $P_2S_5$-based glass ($Li_xP_yS_z$, 0<x<3, 0<y<3, 0<z<7), such as $LiI—Li_2S—P_2S_5$, or a mixture thereof.

Meanwhile, according to an embodiment of the present disclosure, the inorganic particles may include composite particles surface-coated with a coupling compound. The composite particles may be coated at least partially or totally with a coupling compound. As used herein, the term 'coated' means that the coupling agent is bound to or attached to the surfaces of the inorganic particles through a chemical, physical, electrochemical process, or the like.

According to an embodiment of the present disclosure, the coupling agent has at least one functional group selected from alkyl, alkoxy and ester groups. For example, the coupling agent includes a silane-based coupling agent, a fatty acid, a titanate-based coupling agent, or the like, and such coupling agents may be used alone or in combination.

Meanwhile, when the coupling agent includes an alkyl group, the alkyl group preferably has 8 or less carbon atoms. When the number of carbon atoms is larger than 8, the coupling agent shows low dispersibility in a ketone-based solvent, such as acetone, which is disadvantageous to preparation of slurry for forming an inorganic coating layer.

The silane-based coupling agent may include at least two functional groups selected from the group consisting of phenyl, vinyl, epoxy, amino, acryloxy, methacryloxy, methoxy, ethoxy, alkyl, isocyanurate and isocyanate groups. Particular examples of the silane-based coupling agent include vinyltrimethoxysilane, vinyltriethoxysilane, 2-(3,4-epoxycyclohexayl)ethylmethoxysilane, 3-glycidoxypropylmethyldimethoxysane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyl- diethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene) propylamine, N-phenyl-3-aminopropyltrimethoxysilane, N-(vinylbenzyl)-2-aminoethyl-3-aminopropyltrimethoxysilane, 3-ureidopropyltriethoxysilane, 3-mercaptopropylmethyldimethoxysilane, 3-mercaptopropyltrimethoxysilane, 3-isocyanatopropyltriethoxysilane, methyltrimethoxysilane, dimethyldimethoxysilane, phenyltrimethoxysilane, methyltriethoxysilane, dimethyldiethoxysilane, phenyltriethoxysilane, hexyltrimethoxysilane, hexyltriethoxysilane, decyltrimethoxysilane, trifluoropropyltrimethoxysilane, or the like. Such silane-based coupling agents may be used alone or in combination.

Particular examples of the fatty acid include stearic acid, palmitic acid, lauric acid, oleic acid, linoleic acid, or the like. Such fatty acids may be used alone or in combination.

Particular examples of the titanate-based coupling agent include monoalkoxy titanate, neoalkoxy titanate, isopropyl tridioctylphosphate titanate, isopropyl tridioctylpyrophosphate titanate, oleyl titanate, isopropyl trioleyl titanate, isopropyl tristearyl, isopropyl triisostearyl titanate, or the like. More particularly, the titanate-based coupling agent may include: titanium acylate, such as tributoxytitanium stearate, isopropxytitanium triisostearate, or mono-i-propoxytitanium tri-i-stearate; titanium alkoxide, such as titanium tetraethoxide, titanium tetrapropoxide, titanium tetrabutoxide, tetracyclohexyl titanate, or tetrabenzyl titanate; titanium chelate, such as di-n-butoxy bis(triethanoaminato) titanium, titanium diisopropoxybis(acetyl acetonate), titanium tetraacetylacetonate, titanium di-2-ethylhexoxybis(2-ethyl-3-hydroxyhexoxide), or titanium diisopropoxybis (ethyl acetoacetate). Such titanate-based coupling agents may be used alone or in combination.

Meanwhile, there is no particular limitation in the average particle diameter of the inorganic particles. However, the inorganic particles preferably have an average particle diameter of 0.1-1.5 μm with a view to formation of a coating layer with a uniform thickness and suitable porosity. When the average particle diameter is smaller than 0.1 μm, dispersibility may be degraded. When the average particle diameter is larger than 1.5 μm, the resultant coating layer may have an increased thickness.

2. Method for Forming Inorganic Coating Layer

The method for manufacturing a separator according to an embodiment of the present disclosure includes: preparing slurry for an inorganic coating layer including inorganic particles, a binder polymer and a solvent; and applying the slurry to at least one surface of a separator substrate, followed by drying. In addition, the drying step may be carried out under a humidified condition. In a variant, the drying step may be carried out by dipping the porous substrate coated with the slurry in a non-solvent, and for example, by solidifying the binder resin and allowing the binder resin to be migrated toward the separator surface under a humidified condition.

First, the binder polymer is dissolved in a solvent to prepare a polymer binder solution. Next, the polymer binder solution is introduced to and mixed with a mixture containing the inorganic particles and solvent to prepare slurry for forming an inorganic coating layer. The inorganic particles may be added, after they are pulverized to a predetermined average particle diameter in advance. In a variant, the inorganic particles may be introduced, and then dispersed while they are controlled and pulverized to a predetermined average particle diameter through a ball milling process, or the like. If necessary, supplementary agents, such as a dispersant, may be further introduced to the mixture and/or slurry.

Then, the slurry is applied onto a porous polymer substrate and is allowed to stand under a humidified condition for a predetermined time to solidify (dry) the binder polymer.

While the binder polymer is solidified under such a humidified condition, phase separation of the binder polymer occurs in the slurry. According to an embodiment of the present disclosure, the humidified condition may include a relative humidity of about 30-70%. During the phase separation, the solvent migrates toward the surface portion of the inorganic coating layer, and the binder polymer migrates toward the surface portion of the inorganic coating layer along with the migration of the solvent, thereby forming an electrode adhesive portion having a high content of binder polymer at the top layer portion so that high adhesion may be realized between an electrode and the separator.

The solvent may be an ingredient capable of dissolving the binder polymer. Preferably, a ketone solvent may be used. According to an embodiment of the present disclosure, the solvent may be selected suitably from acetone, methyl ethyl ketone, N-methyl pyrrolidone, and polar amide solvents such as dimethyl acetamide, dimethyl formamide and diethyl formamide, but is not limited thereto.

Meanwhile, as described above, the inorganic particles may include composite particles surface-coated with a coupling agent. The composite particles may be prepared through a spray coating process including spraying a solution containing a coupling agent dispersed therein to the surfaces of the inorganic particles so that the surfaces of the inorganic particles may be coated with the coupling agent. In a variant, after the inorganic particles are dispersed in a suitable solvent, such as water, and then the coupling agent is introduced thereto and agitation is carried out so that the surfaces of the inorganic particles may be coated with the coupling agent. The method for coating the inorganic particles with the coupling agent is not particularly to any one method, and a known coating process, such as spray coating, may be used.

Meanwhile, the slurry may be applied through a conventional coating process, such as Mayer bar coating, die coating, reverse roll coating or gravure coating. When the inorganic coating layer is formed on both surfaces of the porous substrate, the coating solution may be applied to each surface and then humidified phase separation and drying may be carried out. However, it is preferred to apply the coating solution to both surfaces of the porous substrate at the same time, followed by humidified phase separation and drying, in terms of productivity.

3. Cell Stack Including Separator

Meanwhile, the present disclosure provides a secondary battery including the separator. The battery includes a negative electrode, a positive electrode and a separator interposed between the negative electrode and the positive electrode, wherein the separator is the separator having the above-described characteristics.

According to the present disclosure, the positive electrode includes a positive electrode current collector and a positive electrode active material layer formed on at least one surface of the current collector and containing a positive electrode active material, a conductive material and a binder polymer. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_xMn_yNi_zCo_{(1-y-z)}O_2$ (wherein x is 0.5-2 and x+y+z=1), chemical formula of $Li_xMn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $Li_aNi_xCo_yMn_zO_2$ ($0<a<1.5$, $0<[x, y, z]<1$, x+y+z=1), chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder polymer. The negative electrode may include, as a negative electrode active material, any one selected from: lithium metal oxide; carbon such as non-graphitizable carbon or graphite-based carbon; metal composite oxides, such as $Li_xFe_2O_3$ ($0\le x\le1$), $Li_xWO_2$ ($0\le x\le1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0\le x\le1$; $1\le y\le3$; $1\le z\le8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder polymer may be a polymer used currently for an electrode in the art. Non-limiting examples of the binder polymer include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alchol, cyanoethyl cellulose, cyanoethyl sucrose, pullulan, and carboxymethyl cellulose.

The cell stack prepared as described above may be introduced to a suitable casing, and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

Meanwhile, according to an embodiment of the present disclosure, the organic solvent includes an ester compound. Preferably, the ester compound may be used in an amount of 30 wt % or more, 50 wt % or more, 60 wt % or more, or 65 wt % or more, based on 100 wt % of the organic solvent.

According to an embodiment of the present disclosure, the ester compound includes at least one selected from the group consisting of isobutyl propionate, isoamyl propionate, isobutyl butyrate, isopropyl propionate, methyl propionate, ethyl propionate, propyl propionate, butyl propionate, methyl acetate, ethyl acetate, propyl acetate, butyl acetate, methyl butyrate, ethyl butyrate, propyl butyrate and butyl butyrate.

In addition, the present disclosure provides a battery module which includes a battery including the cell stack as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

[Manufacture of Separator]

Examples 1-6

Figure 3:
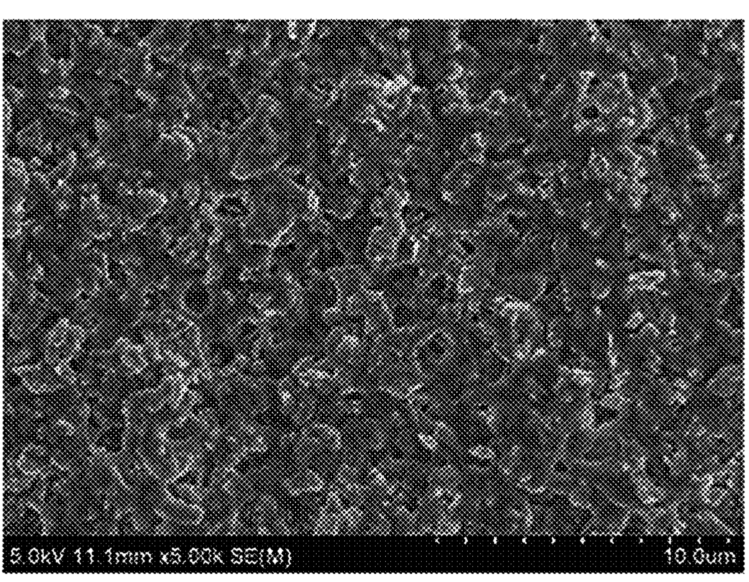
FIG. 3 is an image illustrating the surface of the separator according to Example 1 of the present disclosure.

First, composite particles and a binder resin were introduced to acetone to obtain slurry for forming an inorganic coating layer. The solid content, except acetone, in each slurry was about 13-15 wt %. The slurry was applied to both surfaces of a separator (polyethylene, porosity 45%, thickness 9 μm) and dried under a humidified condition of a relative humidity of 45% at 23° C. After drying, the thickness of coating layers was 6 μm on both surfaces (3 μm on each surface), and the coating layer was loaded at 7.2 g/m$^2$ based on the area of the separator. Then, the dried product was cut into a size of 60 mm (length)×25 mm (width) to obtain a separator. FIG. 3 illustrates the surface of the separator according to Example 1 of the present disclosure. It can be seen that the coating layer surface is coated with the binder resin through the phase separation of the binder resin. The composition of the inorganic particles/composite particles and binder polymer used in each Example is shown in the following Table 1. In Table 1, Examples 1, 3, 5 and 6 use $Al(OH)_3$ (D50: 900 nm) (Composite particles 1) surface-treated with triethoxypropylsilane, and Examples 2 and 4 use $Al(OH)_3$ (D50: 900 nm) (Composite particles 2) surface-treated with isopropyltrioleyl titanate. The composite particles were obtained by spraying a solution containing each coupling agent, while $Al(OH)_3$ particles were agitated, so that the surfaces of the inorganic particles might be coated with the coupling agent, and then drying the resultant particles at 90° C. for 2 hours.

Figure 2:
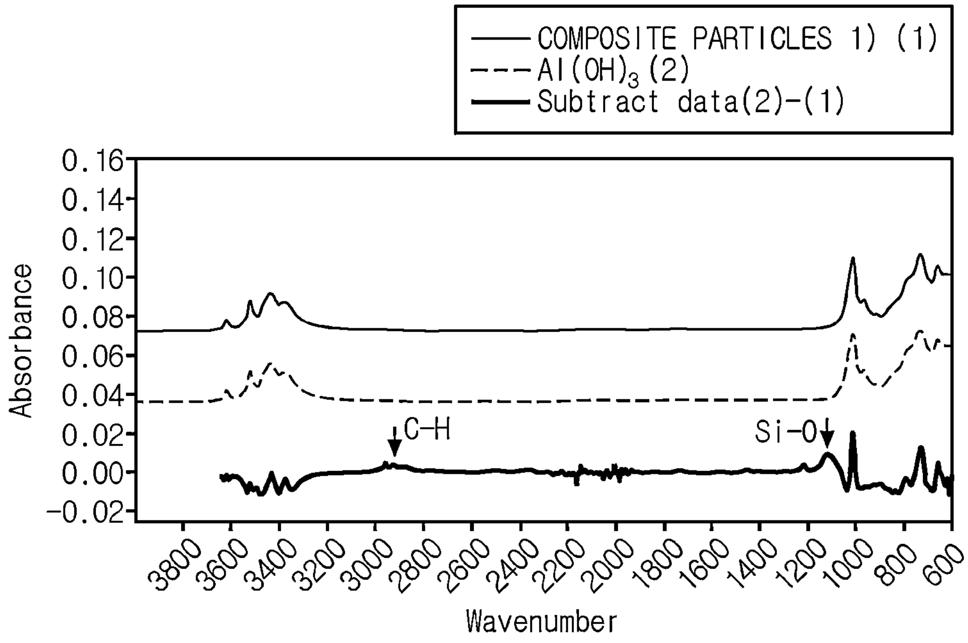
FIG. 2 is a graph illustrating the IR analysis results of Composite particles 1 according to Example.

Composite particles 1 were analyzed by IR spectroscopy to determine whether they were surface-coated or not. FIG. 2 illustrates the IR analysis result of non-coated composite particles and Composite particles 1. It can be seen from FIG. 2 that C—H peaks and Si—O peaks appear as a result of coating.

Meanwhile, Composite particles 2 were evaluated in terms of dispersibility to determine whether they were coated or not. Non-coated particles ($Al(OH)_3$) were mixed with PVAc at a weight ratio of 75:25, and the resultant mixture was introduced to acetone. The solid content, except the solvent, was 15 wt %. The resultant dispersion was introduced to a dispersion analyzer (Lumisizer, available from LUM), centrifugal force was applied thereto, while rotating the dispersion at a rate of 1,000 rpm, and then the sedimentation rate was determined depending on time. Meanwhile, the same procedure was carried out for Composite particles 2. The results are shown in the following Table 2. As can be seen from Table 2, in the case of coated Composite particles 2, they are coated with a titanate-based compound, and thus show a significantly reduced sedimentation rate as compared to non-coated particles.

TABLE 1

| | | Ex. 1 | Ex. 2 | Ex. 3 | Ex. 4 | Ex. 5 | Ex. 6 |
|---|---|---|---|---|---|---|---|
| Content of inorganic materials (wt %) | Inorganic particles (Non-surface coated) | 0 | 0 | 0 | 0 | 0 | 0 |
| | Composite particles 1) | 75 | 0 | 75 | 0 | 75 | 75 |
| | Composite particles 2) | 0 | 75 | 0 | 75 | 0 | 0 |
| Content of binder (wt %) | PVAc | 25 | 25 | 0 | 0 | 25 | 25 |
| | Molecular weight of PVAc | 600,000 | 600,000 | 600,000 | 600,000 | 450,000 | 330,000 |
| | Glass transition temperature of PVAc | 30-45° C. | 30-45° C. | 30-45° C. | 30-45° C. | 30-45° C. | 30-45° C. |
| | EVA | 0 | 0 | 25 | 25 | 0 | 0 |
| | Glass transition temperature of EVA | 31° C. | 31° C. | 31° C. | 31° C. | 31° C. | 31° C. |
| Content of dispersant (wt %) | Silane-based dispersant Vinyltrimethoxysilane | 0 | 0 | 0 | 0 | 0 | 0 |
| | Titanate-based dispersant Isopropyl triisostearyltitanate | 0 | 0 | 0 | 0 | 0 | 0 |
| Peel force (gf/15 mm) | | 127 | — | — | — | — | — |
| Adhesion to electrode (gf/25 mm) | | 109 | 102 | 121 | 110 | 105 | 112 |

TABLE 2

| | $Al(OH)_3$ | Composite particles 2 |
|---|---|---|
| Particle size (D50, μm) | 3.22 | 1.31 |
| Sedimentation rate (μm/s) | 123 | 4.9 |

Comparative Examples 1-8

Inorganic particles, a binder resin and a dispersant were introduced to acetone to obtain slurry for forming an inorganic coating layer. In addition, the solid content, except acetone, in each slurry was about 13-15 wt %. The slurry was applied to both surfaces of a separator (polyethylene, porosity 45%, thickness 9 μm) and dried under a humidified condition of a relative humidity of 45% at 23° C. After drying, the thickness of coating layers was 6 μm on both surfaces (3 μm on each surface), and the coating layer was loaded at 7.2 $g/m^2$ based on the area of the separator. Then, the dried product was cut into a size of 60 mm (length)×25 mm (width) to obtain a separator. The composition of the inorganic particles/composite particles and binder polymer used in each Comparative Example is shown in the following Table 3 and Table 4.

Comparative Example 9

Figure 4:
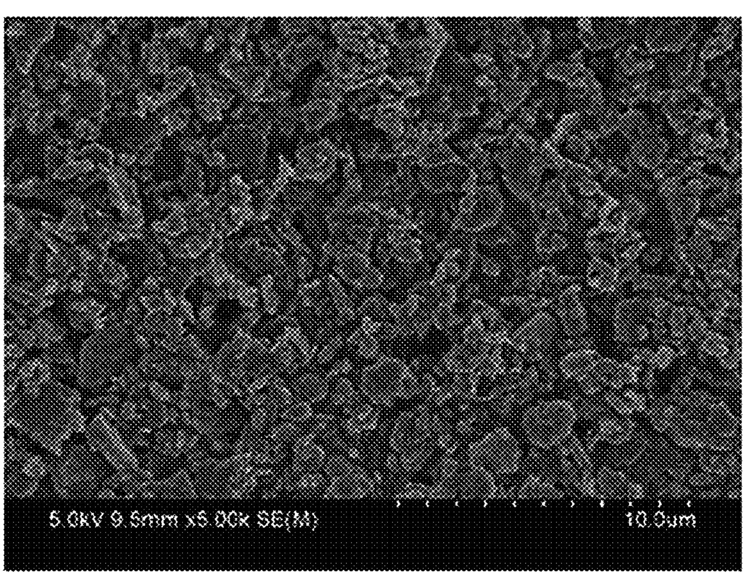
FIG. 4 is an image illustrating the surface of the separator according to Comparative Example 9.

Slurry for forming an inorganic coating layer was obtained in the same manner as Example 1. The slurry was applied to both surfaces of a separator (polyethylene, porosity 45%, thickness 9 μm) and dried naturally at room temperature to remove the solvent. After drying, the thickness of coating layers was 6 μm on both surfaces (3 μm on each surface), and the coating layer was loaded at 7.2 $g/m^2$ based on the area of the separator. FIG. 4 illustrate the surface of the separator according to Comparative Example 9. It can be seen that no phase separation of the binder resin occurs, and no binder resin can be seen on the surface of the inorganic coating layer. As a result, it is difficult to ensure adhesion to an electrode, as compared to Examples.

TABLE 3

| | | | Comp. Ex. 1 | Comp. Ex. 2 | Comp. Ex. 3 | Comp. Ex. 4 | Comp. Ex. 5 |
|---|---|---|---|---|---|---|---|
| Content of inorganic materials (wt %) | Inorganic particles (Non-surface coated) | | 75 | 75 | 75 | 75 | 0 |
| | Composite particles 1) | | 0 | 0 | 0 | 0 | 75 |
| | Composite particles 2) | | 0 | 0 | 0 | 0 | 0 |
| Binder polymer | PVAc | Content (wt %) | 23 | 23 | 0 | 0 | 0 |
| | | Molecular weight | 600,000 | 600,000 | — | — | — |
| | | Glass transition temperature | 30-45° C. | 30-45° C. | — | — | — |
| | EVA | Content (wt %) | 0 | 0 | 23 | 23 | 0 |
| | | Glass transition temperature | — | — | 31° C. | 31° C. | — |
| | PVDF-HFP | Content (wt %) | | 0 | 0 | 0 | 25 |
| Content of dispersant (wt %) | Silane-based dispersant Vinyltrimethoxysilane | | 2 | 0 | 2 | 0 | 0 |
| | Titanate-based dispersant Isopropyl triisostearyltitanate | | 0 | 2 | 0 | 2 | 0 |

TABLE 3-continued

| | Comp. Ex. 1 | Comp. Ex. 2 | Comp. Ex. 3 | Comp. Ex. 4 | Comp. Ex. 5 |
|---|---|---|---|---|---|
| Peel force (gf/15 mm) | — | — | — | — | 36 |
| Adhesion to electrode (gf/25 mm) | 14 | 17 | 11 | 15 | 31 |

TABLE 4

| | | | Comp. Ex. 6 | Comp. Ex. 7 | Comp. Ex. 8 |
|---|---|---|---|---|---|
| Content of inorganic materials (wt %) | Inorganic particles (Non-surface coated) | | 0 | 0 | 0 |
| | Composite particles 1) | | 75 | 75 | 75 |
| | Composite particles 2) | | 0 | 0 | 0 |
| Binder polymer | PVAc | Content (wt %) | 25 | 25 | 25 |
| | | Molecular weight | 700,000 | 800,000 | 900,000 |
| | | Glass transition temperature | 30-45° C. | 30-45° C. | 30-45° C. |
| | EVA | Content (wt %) | 0 | 0 | 0 |
| | | Molecular weight | — | — | — |
| | PVDF-HFP | Glass transition temperature | | | |
| Content of dispersant (wt %) | Silane-based dispersant Vinyltrimethoxysilane | | 0 | 0 | 0 |
| | Titanate-based dispersant Isopropyl triisotearyltitanate | | 0 | 0 | 0 |
| Peel force (gf/15 mm) | | | — | — | — |
| Adhesion to electrode (gf/25 mm) | | | 54 | 37 | 26 |

(2) Test Examples

1) Evaluation of Peel Force

Each of the separators according to Example 1 and Comparative Example 5 was cut into a size of 15 mm×100 mm. A double-sided adhesive tape was attached to a glass plate, and the inorganic coating layer surface of the separator was attached to the adhesive tape. Then, the end portion of the separator was mounted to a UTM instrument (LLOYD Instrument LF Plus), and force was applied at 180° and a rate of 300 mm/min. The force required for separating the porous coating layer from the porous polymer substrate was measured. Example 1 shows a peel force of 127 gf/15 mm, and Comparative Example 5 shows a peel force of 36 gf/15 mm. Therefore, it can be seen that the separator according to the present disclosure shows excellent peel force, when using PVDF-HFP, which is a crystalline polymer.

2) Evaluation of Adhesion to Electrode

The adhesion between an electrode and each separator was determined. First, artificial graphite (average particle diameter: 16 μm), Super C65, styrene butadiene rubber (SBR) and carboxymethyl cellulose were mixed at a weight ratio of 95.9:1:1.9:1.2, and water was added thereto to prepare negative electrode slurry. The negative electrode slurry was applied to copper foil to a thickness of 65 μm, and vacuum dried at 130° C. for 8 hours, followed by pressing, to obtain a negative electrode having an area of 1.4875 $cm^2$. Herein, the loading amount of the negative electrode was 3.60 $mAh/cm^2$.

The resultant negative electrode was cut into a size of 25 mm×100 mm. In addition, each of the separators obtained according to Examples 1-6 and Comparative Examples 1-8 was cut into a size of 25 mm×100 mm. The separator was stacked with the negative electrode, and the stack was inserted between PET films having a thickness of 100 μm and adhered by using a flat press. Herein, the flat press was heated and pressurized at 60° C. under a pressure of 6.5 MPa for 1 second. The adhered separator and negative electrode were attached to slide glass by using a double-sided tape. The end portion (10 mm or less from the end of the adhered surface) of the separator was peeled off and attached to a 25 mm×100 mm PET film by using a single-sided tape so that they might be connected in the longitudinal direction. Then, the slide glass was mounted to the lower holder of a UTM instrument (LLOYD Instrument LF Plus), and the PET film adhered to the separator was mounted to the upper holder of the UTM instrument. Then, force was applied at 180° and a rate of 300 mm/min. The force required for separating the negative electrode from the inorganic coating layer facing the negative electrode was measured. Each of the separators according to Examples 1-6 shows an adhesion of higher than 100 gf/25 mm, while each of the separators according to Comparative Examples 1-8 shows a significantly lower level of adhesion as compared to Examples 1-6.

What is claimed is:

1. A separator for an electrochemical device, comprising:
a porous polymer substrate; and
an inorganic coating layer on at least one surface of the porous polymer substrate,
wherein the inorganic coating layer comprises inorganic particles and a binder polymer,
wherein the inorganic particles comprise composite particles having a surface at least partially coated with a coupling compound,
wherein the coupling compound comprises a functional group capable of being bound to each of the inorganic particles and the binder polymer, and the functional group comprises at least one selected from the group consisting of an alkyl group, an alkoxy group and an ester group, and
wherein the binder polymer comprises at least one of an amorphous polymer or a semi-crystalline polymer having a glass transition temperature (Tg) of 60° C. or lower, and
wherein the coupling compound comprises triethoxypropylsilane or isopropyltrioleyl titanate.

2. The separator for the electrochemical device according to claim 1, wherein the binder polymer comprises at least one compound represented by the following Chemical Formula 1:

[Chemical Formula 1]

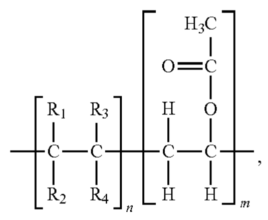

wherein each of $R_1$ to $R_4$ independently represent —H, —$OR_5$, —C(=O)—$R_6$, —C(=O)O—$R_7$, —OC(=O)—$R_8$ or —C(=O)NH—$R_9$; each $R_5$ to $R_9$ independently represents H, or a substituted or non-substituted C1-C5 alkyl group; m is an integer of 1 or more; and n is 0 or an integer of 1 or more.

3. The separator for the electrochemical device according to claim 1, wherein the binder polymer comprises at least one selected from the group consisting of polyvinyl acetate and polyethylene-co-vinyl acetate.

4. The separator for the electrochemical device according to claim 1, wherein the binder polymer has a weight average molecular weight (Mw) of 600,000 or less.

5. The separator for the electrochemical device according to claim 1, wherein the inorganic coating layer comprises the inorganic particles in an amount of 50 wt % or more, based on 100 wt % of a total weight of the binder polymer and the inorganic particles, and the inorganic coating layer has a porous structure formed from interstitial volumes between the inorganic particles.

6. The separator for the electrochemical device according to claim 1, wherein the inorganic coating layer has a top layer portion and a bottom layer portion, wherein the top layer portion comprises an electrode adhesive portion in which the binder polymer is distributed at a higher concentration as compared to the other bottom layer portion.

7. The separator for the electrochemical device according to claim 1, wherein the binder polymer further comprises a crystalline binder resin.

8. A method for manufacturing the separator for the electrochemical device as defined in claim 1, comprising the steps of:

introducing a solvent and the binder polymer to prepare a polymer solution;

introducing the inorganic particles to the polymer solution to prepare a slurry for forming the inorganic coating layer; and applying the slurry to the surface of the porous polymer substrate and drying under a humidified condition to perform a humidified phase separation process of the inorganic coating layer, wherein the inorganic coating layer has a top layer portion and a bottom layer portion, formed through the humidified phase separation process, wherein the top layer portion comprises an electrode adhesive portion in which the binder polymer is distributed at a higher concentration as compared to the bottom layer portion.

9. The method for manufacturing the separator for the electrochemical device according to claim 8, wherein the inorganic particles comprise composite particles having the surface entirely coated with a coupling compound.

10. The separator for the electrochemical device according to claim 1, wherein the inorganic particles comprise $Al(OH)_3$.

11. The separator for the electrochemical device according to claim 1, wherein the binder polymer comprises polyvinyl acetate having a weight average molecular weight (Mw) of 450,000 or more and 600,000 or less.

12. The separator for the electrochemical device according to claim 1, wherein the binder polymer has a weight average molecular weight (Mw) of 600,000 or less, the inorganic coating layer has a top layer portion and a bottom layer portion, the top layer portion comprising an electrode adhesive portion in which the binder polymer is distributed at a higher concentration as compared to the bottom layer portion, and the electrode adhesive portion is formed by a humidification phase separation process in which a slurry for forming the inorganic coating layer including a solvent, the binder polymer, and the inorganic particles is applied to a surface of a porous polymer substrate and dried under humidification conditions.

* * * * *